(12) United States Patent
Hanafusa et al.

(10) Patent No.: US 6,805,992 B1
(45) Date of Patent: Oct. 19, 2004

(54) BATTERY AND PORTABLE DEVICE

(75) Inventors: Kiyoshi Hanafusa, Hyogo (JP); Hiroichi Ishida, Hyogo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/913,170

(22) PCT Filed: Dec. 17, 1999

(86) PCT No.: PCT/JP99/07131

§ 371 (c)(1),
(2), (4) Date: Aug. 10, 2001

(87) PCT Pub. No.: WO01/45185

PCT Pub. Date: Jun. 21, 2001

(51) Int. Cl.[7] ............................................... H01M 2/12
(52) U.S. Cl. ........................................................ 429/56
(58) Field of Search ...................................... 429/53, 56

(56) References Cited

U.S. PATENT DOCUMENTS

| | | | |
|---|---|---|---|
| 4,175,166 A | | 11/1979 | Rosansky |
| 4,581,304 A | * | 4/1986 | Beatty et al. .................. 429/56 |
| 5,733,674 A | * | 3/1998 | Law et al. ...................... 429/9 |
| 6,159,631 A | * | 12/2000 | Thompson et al. ............ 429/82 |

FOREIGN PATENT DOCUMENTS

| | | | |
|---|---|---|---|
| CA | 2165152 A | * | 6/1997 |
| JP | 62-40769 U | | 3/1987 |
| JP | 62-99165 U | | 6/1987 |
| JP | 5-30656 U | | 4/1993 |
| JP | 5-87814 U | | 11/1993 |
| JP | 07296790 A | | 11/1995 |
| JP | 10092397 A | | 4/1998 |
| JP | 10261391 A | | 9/1998 |
| JP | 11025946 A | | 1/1999 |
| JP | 11185714 A | | 7/1999 |

OTHER PUBLICATIONS

Handbook of Batteries, Second Edition. Ed. David Linden. New York: McGraw–Hill, Inc., 1995, pp. 3.16, 5.7, 11.6, 14.35, 14.4 14.51, 14.84, 28.6, 33.4, A.1, A.2, and A.5.*

* cited by examiner

Primary Examiner—Susy Tsang-Foster
(74) Attorney, Agent, or Firm—Rothwell, Figg, Ernst & Manbeck, PC (57) ABSTRACT

A battery (1, 11a to 11c, 31 to 36) includes a cylindrical or polygonal exterior can (2, 12); a safety valve (4, 14, 18, 19, 41 to 46) provided to the exterior can (2, 12) to reduce an internal pressure of the battery (1, 11a to 11c, 31 to 36). The exterior can (2, 12) includes: a relatively thick portion (2a, 2c, 12c) and a relatively thin portion (2d, 12d, 41a to 41c, 42a, 42b, 43a to 43d, 44a, 45a, 46a). The relatively thin portion (2d, 12d, 41a to 41c, 42a, 42b, 43a to 43d, 44a, 45a, 46a) constitutes the safety valve (4, 14, 18, 19, 41 to 46).

5 Claims, 10 Drawing Sheets

BATTERY AND PORTABLE DEVICE

TECHNICAL FIELD

The present invention generally relates to a battery and a portable equipment, and more particularly, to a battery having a safety valve such as to reduce an internal pressure thereof when the internal pressure rises high and to a portable equipment using the battery.

BACKGROUND ART

Along with the widely spread use of portable equipments such as a portable telephone, a note book PC or the like in recent years, studies have been progressed on a battery for use in the equipments. A structure of a battery used in a portable equipment is described in, for example, Japanese Patent Laying-Open No. 7-296790(1995).

Figure 23:
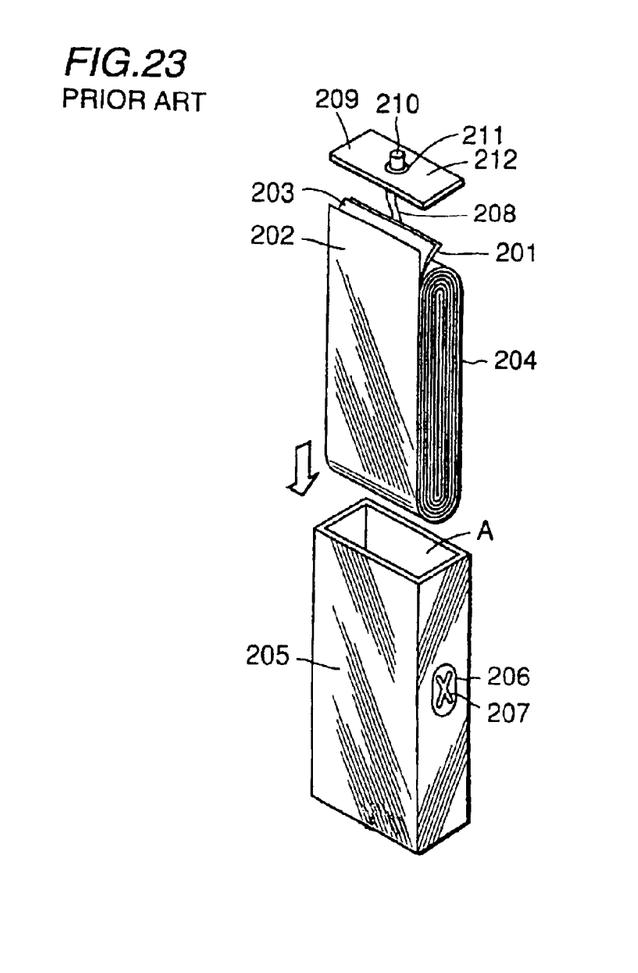
FIG. 23 is a perspective view of a prior art battery.

FIG. 23 is a perspective view of a battery described in the publication. Referring to FIG. 23, the battery is constructed of an electrode group 204, a rectangular prismatic battery case 205 housing the electrode group 204, an opening seal plate 212 sealing up the electrode group housed in the rectangular prismatic case 205.

The electrode group 204 is formed by rolling up a composite of an anode plate 201 and a cathode plate 202 with a separator 203 interposing therebetween into a whirl-like bundle.

The rectangular prismatic battery case 205 has an opening face A. The electrode group 204 is inserted into the case 205 through the opening face A. The rectangular prismatic battery case 205 has a space in the interior thereof. The rectangular prismatic case 205 is fabricated from an iron plate of 0.3 mm in thickness. The rectangular prismatic battery case 205 is filled with an electrolyte.

The opening seal plate 212 is constructed of a lid plate 209, a glass hermetic seal 211 and an anode terminal 210. The glass hermitic seal 211 is present between the opening seal plate 212 and the anode terminal 210.

The anode terminal 210 and an anode plate 201 are electrically connected to each other by an anode lead 208. The anode lead 208 is connected to the anode terminal 210 by means of resistance welding. Furthermore, the lid plate 209 is fixed to the rectangular prismatic battery case 205 by means of laser welding.

A gas vent is provided to the rectangular prismatic battery case 205. A rupture film 206 is provided so as to close the gas vent. An etched portion 207 small in thickness formed by etching is provided to the rupture film 206.

Such a prior art battery has cases where a temperature rises high therein due to various causes: as examples, a case where the battery is exposed to a high temperature, a case where internal or external short-circuit arises and a case where an excessive current discharge occurs to a rapid temperature increase. Especially in a case of a secondary battery, when charge is effected under application of an excessively high voltage in excess of a prescribed value, the battery would be heated to a high temperature.

When a battery is in a high temperature condition, an electrolyte evaporates to generate gas. Furthermore, the electrolyte also decomposes to generate gas. Since this gas is confined within the rectangular prismatic battery case 205, an internal pressure of the battery increases. A further increase in the internal pressure breaks the battery and in some cases, a human body would be exposed to a danger.

Such circumstances being considered, a rupture film 206 has been provided to the rectangular prismatic battery case 205 to cope with the breakage caused by a built-up internal pressure. The rupture film 206 works this way: When an internal pressure of a battery exceeds a prescribed value, the etched portion 207 of the rupture film 206 is first blown off to avoid the breakage of a battery body itself. Gas or an electrolyte is leaked out through the blown-off portion to prevent increase in the internal pressure of the battery. The battery shown in FIG. 23 is designed such that when the internal pressure thereof reaches $8.8 \times 10^5$ Pa, the rupture film 206 is broken.

In a construction as shown in FIG. 23, however, a necessity arises that the rupture film 206 is provided as a separate member from the rectangular prismatic battery case 205, which has produced a problem to cause increase in manufacture cost.

Therefore, the present invention has been made in order to solve the problem as described above.

It is accordingly an object of the present invention to provide a battery having a safety valve capable of suppressing an increase in manufacture cost while adopting a simple and easy construction and a portable equipment using the battery.

DISCLOSURE OF THE INVENTION

A battery according to the present invention has an exterior member and a safety valve. The exterior member is of a tube-like shape. The safety valve is provided to the exterior member to reduce an internal pressure of the battery. The exterior member includes a relatively thick portion and a relatively thin portion, wherein the relatively thin portion constitutes the safety valve.

In a battery of such a construction, since the safety valve can be formed with a difference in thickness of the exterior member, the safety valve can be provided without using a separate member. As a result, a construction thereof is simple and easy, thereby enabling suppression of increase in manufacture cost.

Furthermore, preferably, the safety valve is formed at a side face of the battery. In this case, the side face of the battery is generally larger in area than is each of a top face thereof and a bottom face thereof. For this reason, a large area safety valve can be formed at the side face, which causes the safety valve to operate at a low pressure, with the result that a level of safety is further increased.

Moreover, preferably, the relatively thin portion is formed so as to surround part of the relatively thick portion. In this case, the thin portion and the thick portion surrounded by the thin portion constitute the safety valve. Since an area of the portions is increased, the safety valve operates at a low pressure, thereby, enabling a level of safety to further increase.

Besides, preferably, at least one of a length, a thickness and a shape of the relatively thin portion and a total area of the relatively thin portion and a region surrounded by the relatively thin portion is adjusted to set an internal pressure of a battery at which the safety valve operates. In this case, the internal pressure of the battery at which the safety valve operates can be properly set, whereby there can be provided a battery with a higher reliability and a higher level of safety.

Furthermore, preferably, the battery further includes an electrode disposed in the region surrounded by the relatively thin portion. In this case, the safety valve can be formed when the electrode is formed; therefore, the safety valve can be formed without adding a new process step.

A portable equipment according to the present invention includes: a battery; and a body of the portable equipment to which the battery is mounted. The battery includes: an exterior member of a tube-like shape and a safety valve provided to said exterior member to reduce an internal pressure of the battery. The exterior member is constituted of a relatively thick portion and a relatively thin portion. The safety valve is located so as to face the body of the portable equipment.

In a portable equipment constructed in such a way, the safety valve is located so as to face the body of the portable equipment. Hence, even when the safety valve operates to eject high pressure gas or liquid, a pressure of the gas or the liquid is imposed only on the body of the portable equipment; so, no chance arises that the pressure acts on a man holding the portable equipment. As a result, a level of safety is improved compared with a portable equipment such as in which a safety valve has its aperture directed to a human body.

Still furthermore, preferably, the portable equipment further includes a shield member interposing between the battery and the body thereof. In this case, even when the safety valve operates to eject high pressure gas or liquid, the gas or liquid is blocked by the shield member such that no pressure is imposed directly on the body of the portable equipment. As a result, a failure of a portable equipment can be prevented, which enables a reliability to further increase.

BEST MODE FOR CARRYING OUT THE INVENTION

Description will be given of the best mode for carrying out the present invention below with reference to the accompanying drawings:

First Embodiment

Figure 1:
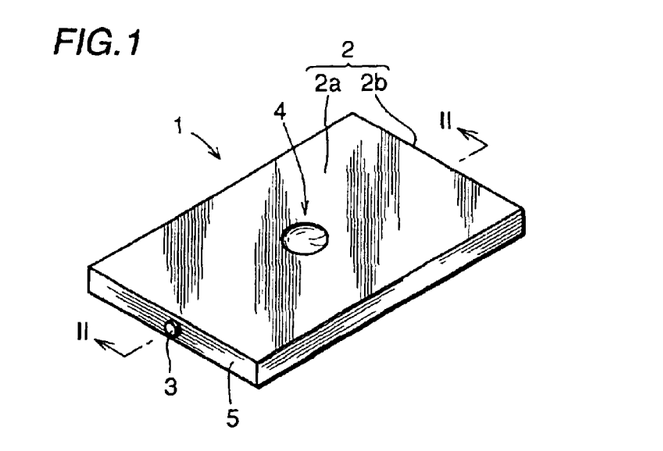
FIG. 1 is a perspective view of a battery according to a first embodiment of the present invention.

Referring to FIG. 1, a battery 1 according to the first embodiment of the present invention includes: an exterior can 2 as a tube-shaped exterior member; an anode terminal 3; a safety valve 4; and a lid 5. The lid 5 is engaged in an opening section of the exterior can 2. The anode terminal 3 is mounted to the lid 5. The safety valve 4 is provided to the exterior can 2.

The exterior can 2 is made of iron and of a rectangular prismatic shape, and has a cylindrical side face 2a and a bottom face 2b as a cathode terminal connected to the side face 2a. The side face 2a is constituted of 4 flat surfaces. The safety valve 4 is provided to a largest flat surface. The side face 2a and the bottom face 2b are electrically connected to each other and assume the same potential as each other.

The lid 5 is attached to the exterior can 2 by welding. The lid 5 has a shape such as seals the opening section surrounded by the side face 2a. Since the lid 5 and the side face 2a are electrically connected to each other, potentials of the lid 5 and the exterior can 2 are the same as each other. The anode terminal 3 is attached to the lid 5. The anode terminal 3 and the lid 5 are electrically insulated against each other. The anode terminal 3 is mounted in a central portion of the lid 5. The anode terminal 3 protrudes from an outer surface of the lid 5.

Figure 2:
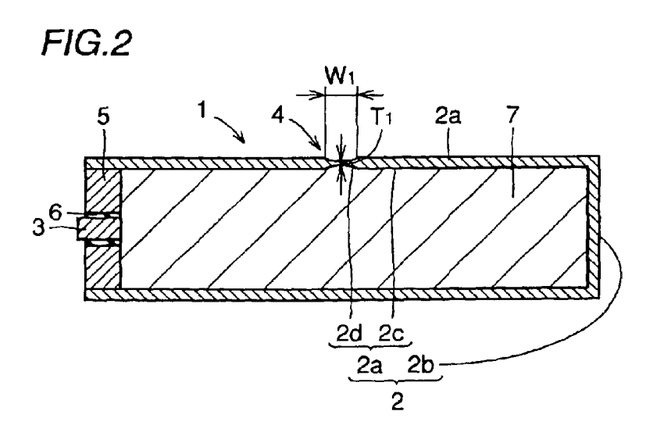
FIG. 2 is a view representing a section taken on line II—II of FIG. 1.

Referring to FIG. 2, the exterior can 2 constituting the battery 1 is of an V-shape and a power generating element (a battery core) 7 is inserted in a space surrounded by the side face 2a and bottom face 2b of the exterior can 2. The power generating element 7 is formed by rolling up a prescribed layer composite into a whirl-like bundle. The layer composite is constituted of a thin plate coated with an anode active material; a thin plate coated with a cathode active material and a separator provided therebetween. The thin plate coated with an anode active material is electrically connected to the anode terminal 3. The thin plate coated with a cathode active material is electrically connected to the exterior can 2. The separator is impregnated with an electrolyte. The interior of the power generating element 7 is degassed in vacuum in order to remove the air and other gases therein.

A size of a space surrounded by the exterior can 2 is of 47 mm in length×29 mm in width×4.2 mm in height. The side face 2a of the exterior can 2 includes a relatively thick iron plate portion 2c and a relatively thin iron plate portion 2d. The relatively thin portion 2d constitutes the safety valve 4. A width W1 of the relatively thin portion 2d ranges from 5 to 15 mm. On the other hand, a thickness T1 of the relatively thin portion 2d ranges from −0.05 to 0.2 mm. The thick portion 2c surrounds the thin portion 2d.

The exterior can 2 has an opening section and the lid 5 is engaged in the opening section. The lid 5 is made of iron and a thickness thereof is about 2 twice (=0.6 mm) as large as that of the thick portion 2c of the exterior can 2. An insulator 6 is embedded in a central section of the lid 5. The anode terminal 3 is provided so as to be in contact with the insulator 6. The anode terminal 3 is electrically insulated against the lid 5 and the exterior can 2 by the insulator 6. The anode terminal 3 is of the shape of a cylinder and the insulator 6 is provided so as to surround the cylinder. Such a method as insulates the anode terminal against the exterior can 2 with the insulator 6 is known as a so-called a hermetic seal method. The thin portion 2d is formed by means of a method in which a local thickness of a plate is reduced by producing injuries, a recess or the like with a press. The thin portion 2d is formed by thinning the side face 2a wall from both of the inner surface side and the outer surface side.

When charge is effected with an excessively high voltage to evaporate an electrolyte or produce gas from the electrolyte in the battery 1 configured in such a way, the thin portion 2d is ruptured if an internal pressure of the battery 1 increases to a pressure ranging from about 3 to 5 atm since the thin portion 2d is weak in strength. With occurrence of the rupture, the internal pressure of the battery decreases, so no chance arises that the battery 1 is explosively broken under an excessively high pressure therein.

Furthermore, this safety valve 4 is fabricated by thinning part of the side face 2a. Hence, a construction is simple and easy, thereby enabling reduction in manufacture cost compared with a case where a separate member is provided in order to form a safety valve 4.

Second Embodiment

Figure 3:
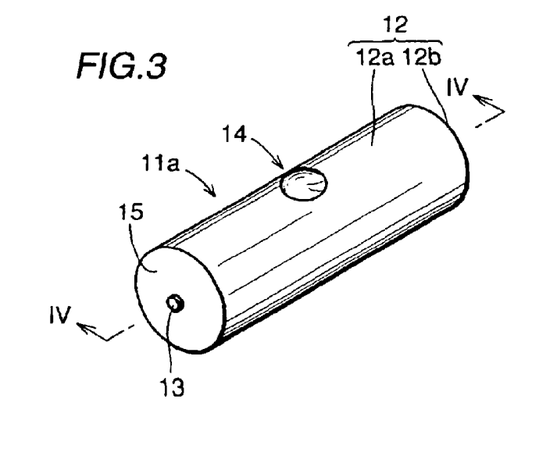
FIG. 3 is a perspective view of a battery according to a second embodiment of the present invention.

Referring to FIG. 3, a battery 11a according to the second embodiment of the present invention includes: an exterior can 12 as an exterior member of a tube-like shape; an anode terminal 13; a safety valve 14 and a lid 15. The lid 15 is engaged in an opening section of the exterior can 12. The anode terminal 13 is attached to the lid 15. The safety valve 14 is provided to the exterior can 12.

The exterior can 12 made of iron has; a side face 12a of the shape of a cylinder; and a bottom face 12b as a cathode terminal of the shape of a disc. The side face 12a is a curved surface of a cylinder with a prescribed curvature and the safety valve 14 is formed at the curved surface. The bottom face 12b is provided at the lower end of the side face 12a.

The side face 12a defines an opening section and the lid 15 is engaged in the opening section. The lid 15 is of the shape of a disc and made of iron. The anode terminal 13 is provided in a central section of the lid 15. The anode terminal 13 and the cover 15 are electrically insulated against each other. The lid 15 and the exterior can 15 are electrically connected to each other. Therefore, a potential of the lid 15 is the same as that of the exterior can 12.

Figure 4:
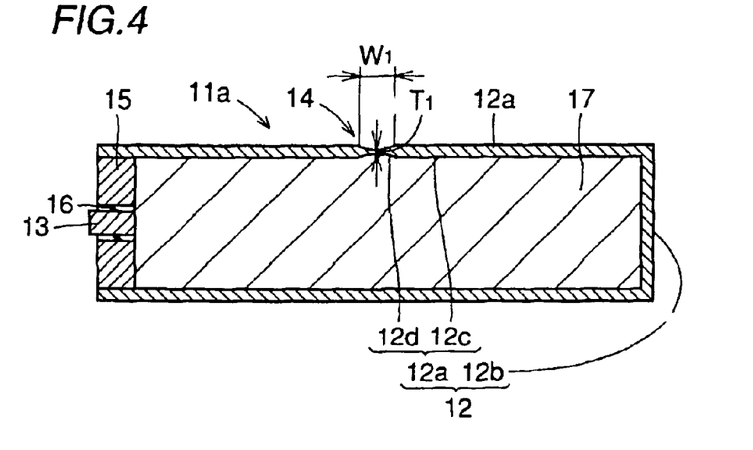
FIG. 4 is a view representing a section taken on line IV—IV of FIG. 3.

Referring to FIG. 4, a cross section of the exterior can 12 constituting the battery 11a is shaped as a rectangle. A space surrounded by the side face 12a and the bottom face 12b is of the shape of a cylinder and a size of the cylinder is 14 mm in diameter×65 mm in length.

A power generating element (a battery core) 17 is inserted into a space surrounded by the side face 12a and the bottom face 12b. The power generating element 17 is constituted in a way similar to the power generating element 7 shown in FIG. 2. That is, the power generating element 17 is constructed of a prescribed layer composite. The layer composite has a structure similar to that of the layer structure constituting the power generating element 7.

The side face 12a includes a relatively thick portion 12c and a relatively thin portion 12d. The side face 12a and the bottom face 12b are both made of iron. A width of the thin portion 12d is $W_1$ and a thickness thereof is $T_1$.

The side face 12a defines an opening section and the lid 15 is engaged therein. The lid 15 is of the shape of a disc and made of iron. An insulator 16 is provided in a central section of the lid 15. The anode terminal 13 is provided so as to penetrate through the insulator 16. The lid 15 and the exterior can 12 are electrically connected to each other; therefore, potentials of the lid 15 and the exterior can 12 are the same as each other. The lid 15 and the anode terminal 13 are electrically insulated against each other. The anode terminal 13 is made of iron. The anode terminal 13 is of the shape of a cylinder and the insulator 16 is provided so as to surround the cylinder.

As a method for forming the thin portion 12d, for example, a method is taken up in which injuries, a recess or the like is formed with performing press on the side face 12a. The thin portion 12d is formed by thinning the side face 12a wall from both of the inner surface side and the outer surface side.

The battery 11a constructed in such away exerts an effect similar to that of the battery 1 shown in the first embodiment.

Third Embodiment

Figure 5:
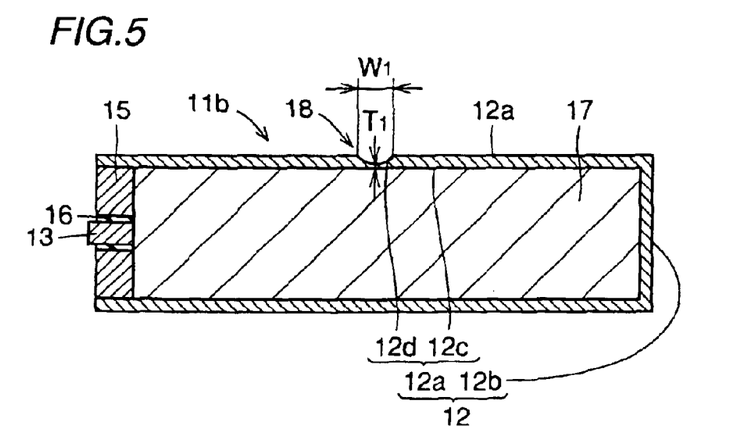
FIG. 5 is a sectional view of a battery according to a third embodiment of the present invention.

Referring to FIG. 5, a battery 11b according to the third embodiment 3 of the present invention is different from the battery 11a shown in FIG. 4, whose safety valve 14 is formed by a press, in that in the battery 11b, a safety valve 18 is formed using a laser. The thin portion 12d constituting the safety valve 18 is fabricated by removing part of the outer surface of the side face 12a according to such a difference between methods. That is, in the thin portion 12d, while the outer surface of the side face 12a is removed, none of the inner surface is removed.

Even the battery 11b constructed in such a way has an effect similar to the battery 1 shown in FIGS. 1 and 2.

Fourth Embodiment

Figure 6:
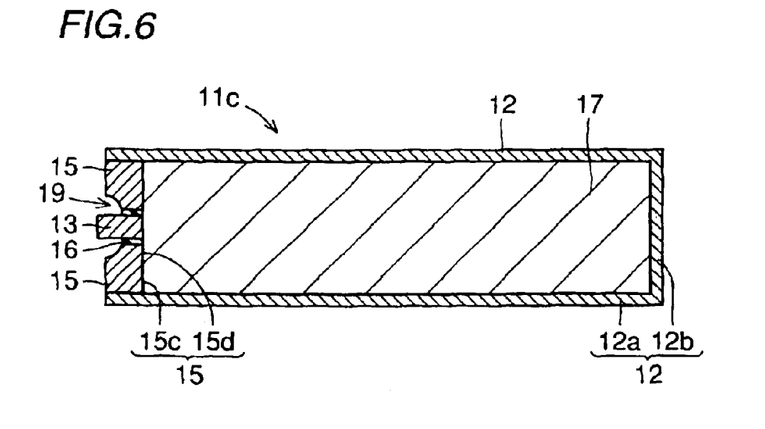
FIG. 6 is a sectional view of a battery according to a fourth embodiment of the present invention.

Referring to FIG. 6, a battery 11c according to the fourth embodiment of the present invention is different from the battery 11b shown in FIG. 5, whose safety valve 18 is formed at the side face 12a of the exterior can 12, in that a safety valve 19 is formed in a lid 15. In the battery 11c, the safety valve 19 is formed by partly removing the lid 15 and an insulator 16. By doing so, in a section of the lid 15 where the safety valve 19 is formed, there arises a relatively thin portion 15d and a relatively thick portion 15c, wherein the relatively thin portion constitutes the safety valve 19. The thin portion 15d is surrounded by the thick portion 15c. A thickness of the thin portion 15d is thinned because that iron is removed by a laser in the thin portion 15d.

Even the battery 11c constructed in such a way exerts an effect similar to the battery 1 shown in the first embodiment.

Fifth Embodiment

Figure 7:
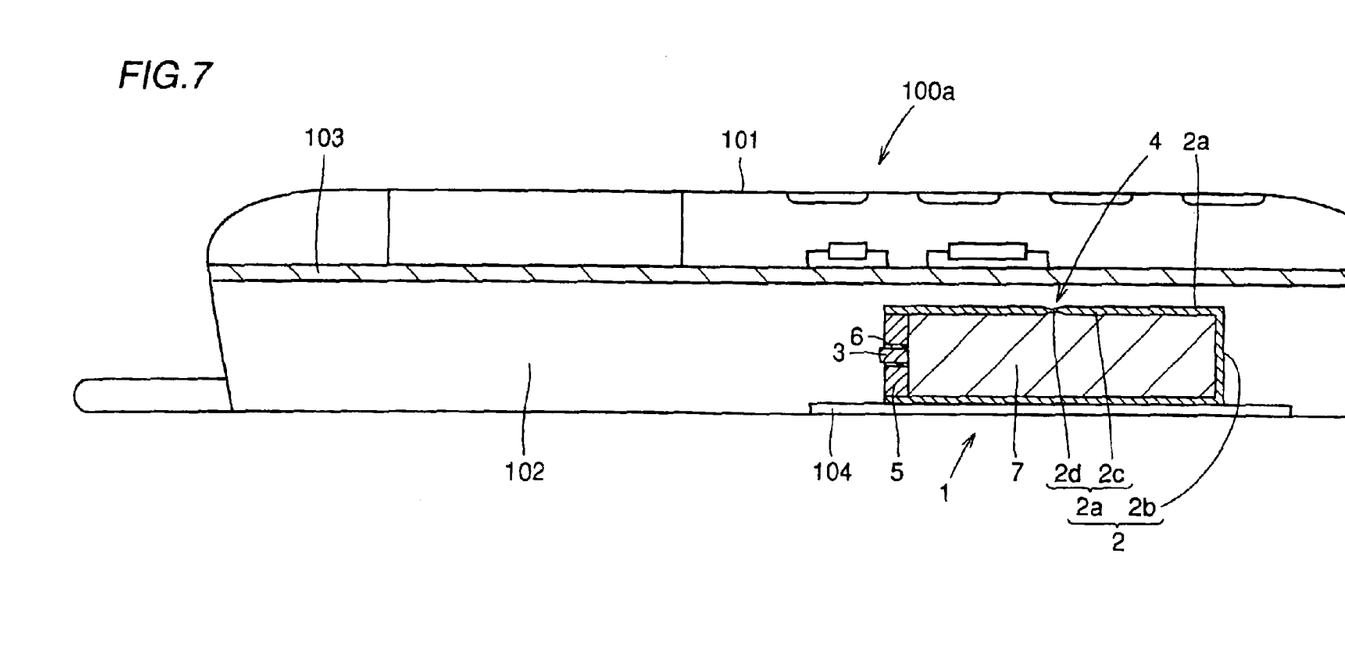
FIG. 7 is a sectional view of a portable telephone according to a fifth embodiment of the present invention.

Referring to FIG. 7, a portable telephone 100a as a portable equipment according to the fifth embodiment of the present invention includes: a telephone case 101; a rear case 102; a body board 103; a cover 104; and a battery. The telephone case 101 and the body board 103 constitute a body of a portable equipment. The body board 103 is attached to the telephone case 101 and the rear case 102. The battery 1 is mounted on the rear case 102 and the rear case 102 is closed by the cover 104. The battery 1 and the body board 103 are electrically connected to each other. An integrated circuit for a radio terminal is mounted on the body board 103. Power is supplied to the integrated circuit from the battery 1. The battery 1 has a construction similar to the battery 1 shown in FIGS. 1 and 2. A safety valve 4 faces the telephone case 101 and the body board 103 as a portable equipment body.

In the portable telephone 100a constructed in such a way, an electrolyte evaporates and gas is generated when a power generating element 7 in the battery 1 is heated to a high temperature for one cause or another. Thereby, an internal pressure of the battery 1 increases. A thin portion 2d constituting the safety valve 4 is ruptured to rapidly eject the gas and the electrolyte from the ruptured portion. However, only the gas and the electrolyte eject to the body board side 103, but the pressure of the gas is hard to be transmitted to the cover 104 side which a man holds. As a result, no harm is given to the man who holds the cover 104 side of the portable telephone 100a, if actually held by the man, thereby resulting in improvement on a level of safety of the portable telephone.

Sixth Embodiment

Figure 8:
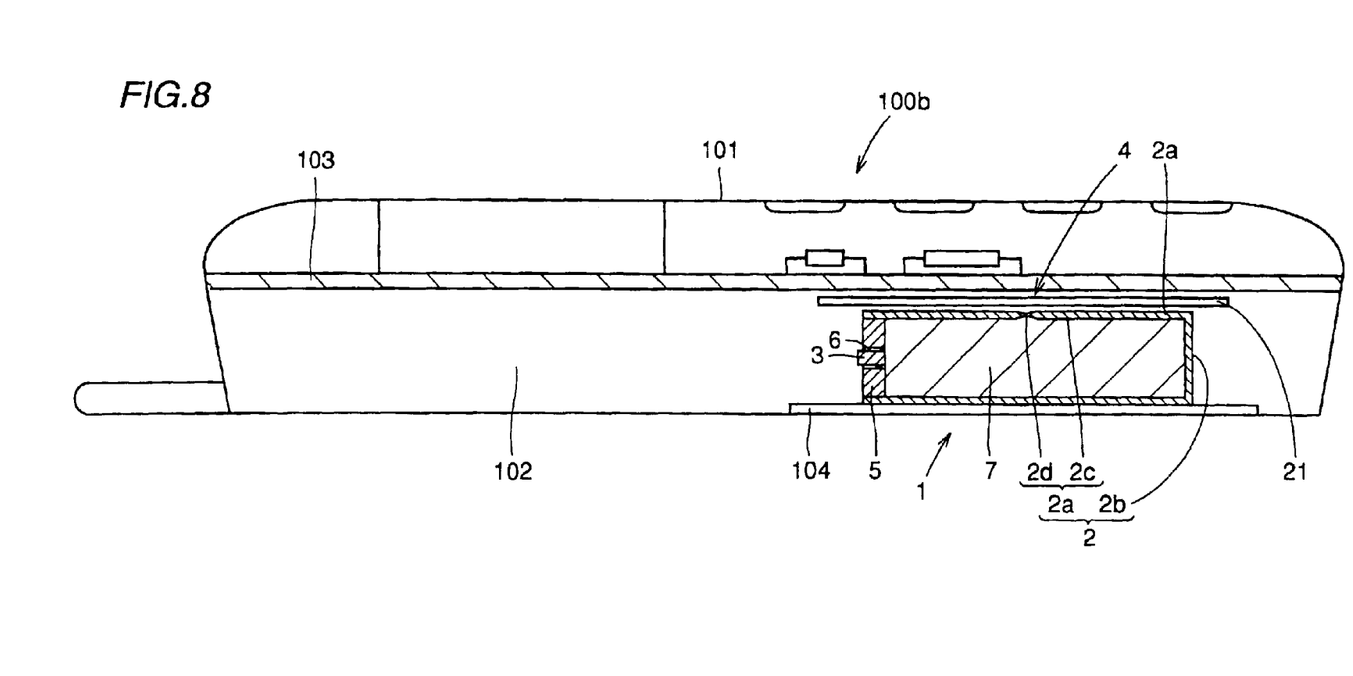
FIG. 8 is a sectional view of a portable telephone according to a sixth embodiment of the present invention.

Referring to FIG. 8, a portable telephone 100b according to the sixth embodiment of the present invention is different from the portable telephone 100a shown in FIG. 7 in that in the telephone 100b, a shield plate 21 as a shield member is provided between a body board 103 and a safety valve 4. The other points in construction of the portable telephone 100b are similar to corresponding points in construction of the portable telephone 100a.

The portable telephone 100b constructed in such a way, first, has an effect similar to the portable telephone 100a. Furthermore, since the shield plate 21 is provided between a safety valve 4 and a body board 103, even gas or an electrolyte that is ejected through the safety valve 4, if actually ejected, does not reach the body board 103 by being blocked with the shield plate 21. As a result, no chance arises of short-circuit in the body board 103, thereby enabling a reliability to increase. Note that a shape of the shield plate 21 can also be such as to surround the battery 1.

Seventh Embodiment

Figure 9:
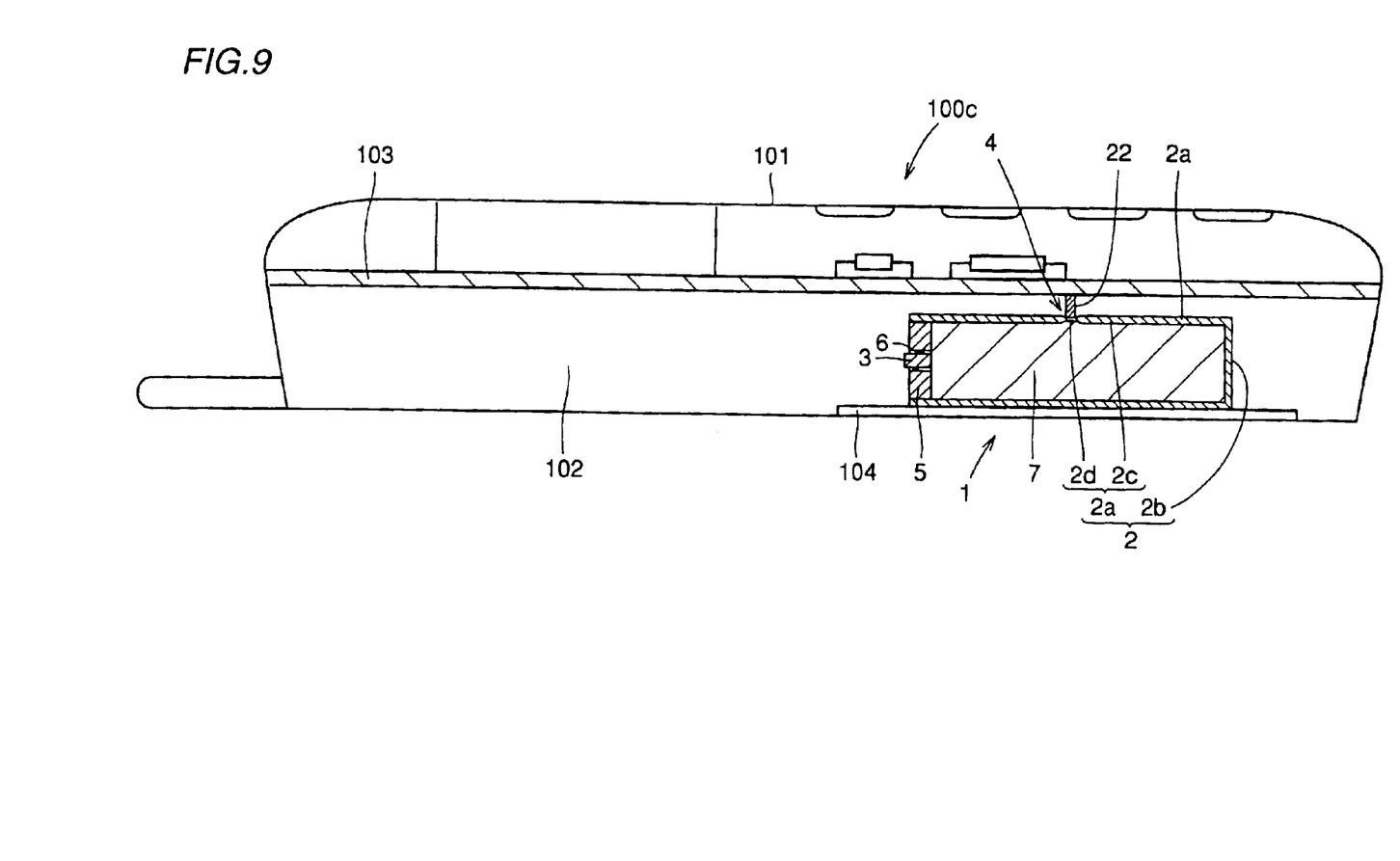
FIG. 9 is a sectional view of a portable telephone according to a seventh embodiment of the present invention.

Referring to FIG. 9, a portable telephone 100c according to the seventh embodiment of the present invention is different from the portable telephone 100a shown in FIG. 7 in that in the portable telephone 100c, a safety valve 4 and a body board 103 are connected to each other by a metal plate 22 and the battery 1 is positioned in place by the metal plate 22. The other parts of the construction of the portable telephone 100c are similar to corresponding parts of the construction of the portable telephone 100a shown in FIG. 7.

The portable telephone 100c constructed in such a way has an effect similar to the portable telephone 100c shown in FIG. 7. Furthermore, since the battery 1 is positioned in place by the metal plate 22, an effect is attained that the battery 1 can be more surly positioned.

Eighth Embodiment

Figure 10:
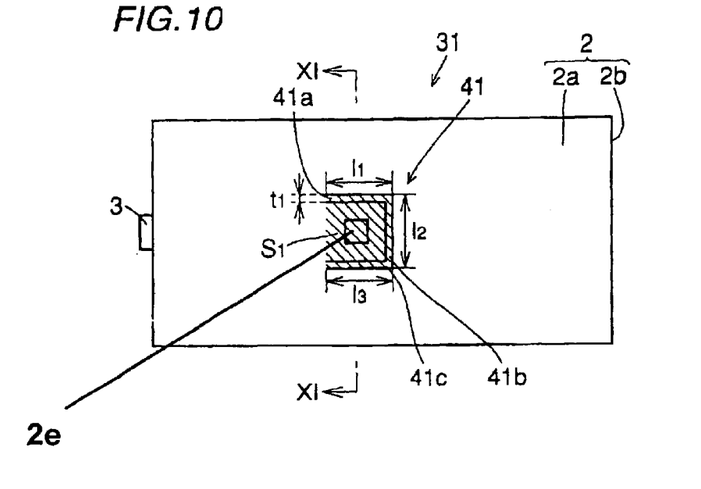
FIG. 10 is a top view of a battery according to an eighth embodiment of the present invention.

Referring to FIG. 10, a battery 31 according to the eighth embodiment of the present invention includes: an exterior can 2; an anode terminal 3 and a safety valve 41. The exterior can 2 and the anode terminal 3 are made of respective materials similar to those of the exterior can 2 and the anode terminal 3 shown in FIG. 1. Furthermore, there exist a lid 5 and an insulator 6 between the exterior can 2 and the anode terminal 3. The safety valve 41 is provided at a side face 2a of the exterior can 2. The safety valve 41 is constituted of three grooves 41a to 41c and a portion surrounded by the three grooves 41a to 41c. That is, the safety valve 41 is constituted of a portion shadowed by hatching in FIG. 10. A cathode terminal 2e is formed in the safety valve 41. A length $l_1$ of the groove 41a is 4 mm. A length $l_2$ of the groove 41b is 5 mm. A length $l_3$ of the groove 41c is 4 mm. A width t1 of the grooves 41a to 41c ranges from 0.05 to 2 mm. Furthermore, the sum $S_1$ of the areas of the grooves 41a to 41c and an area surrounded by the grooves 41a to 41c is $S_1$=20 mm$^2$.

Figure 11:
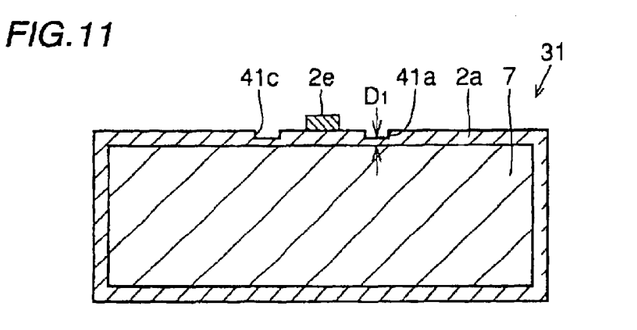
FIG. 11 is a view representing a section taken on line XI—XI of FIG. 10.

Referring to FIG. 11, a power generating element 7 is inserted into a space surrounded by the side face 2a. The power generating element 7 is constructed in a way similar to the power generating element 7 shown in FIG. 2. The power generating element 7 is electrically connected to the anode terminal 3 and the exterior can 2. On the surface of the side face 2a, the grooves 41a and 41c are formed as relative thin portions. A thickness $D_1$ of thin portions of the grooves 41a and 41c ranges from 0.05 to 0.2 mm. The portions where the grooves 41a to 41c are formed each are a relatively thin portion of an iron plate constituting the side face 2a and the other portion other than the portions of the grooves 41a to 41c is a relatively thick portion of the iron plate. The relatively thin portions and relatively thick portion are constructed in one body with each other.

The battery 31 constructed in such a way, first, has an effect similar to that of the battery 1 shown in FIGS. 1 and 2. Furthermore, since the relatively thin portions of the iron plate where the grooves 41a to 41c are formed surround part of the relative thick portion of the iron plate, a safety valve is constituted of the thin portions and the thick portion surrounded by the thin portions. For this reason, an area of the safety valve is increased. As a result, the safety valve 41 can be operated at a relatively low pressure (ranging from 3 to 5 atm or $3.04\times10^5$ to $5.07\times10^5$ Pa), thus, enabling a level of safety to rise.

Ninth Embodiment

Figure 12:
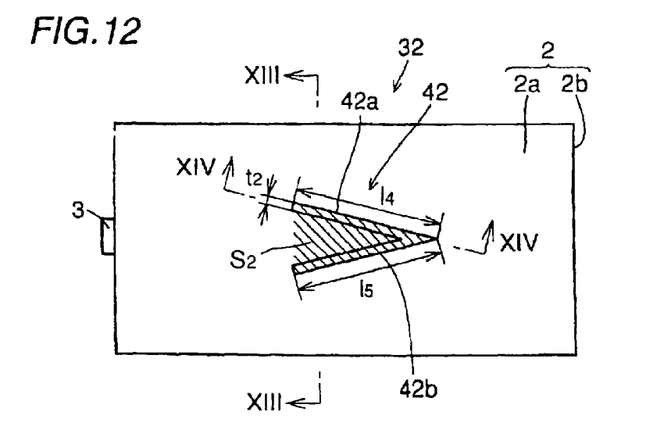
FIG. 12 is a top view of a battery according to a ninth embodiment of the present invention.

Referring to FIG. 12, a battery 32 according to the ninth embodiment of the present invention is different from the battery 31 shown in FIG. 10 whose safety valve 41 is of a shape of a rectangle in that in the battery 32, a safety valve 42 is of the shape of a triangle. The safety valve 42 is constituted of grooves 42a and 42b, and a region surrounded by the grooves 42a and 42b. That is, the safety valve 42 is constituted of a portion shadowed by hatching of FIG. 12. A length $l_4$ of the groove 42a is 12 mm. A length $l_5$ of the groove 42b is 12 mm. A width $t_2$ of the grooves 42a and 42b range from 0.05 to 2 mm. The sum $S_2$ of areas of the grooves 42a and 42b, and an area of the portion surrounded by the grooves 42a and 42b is 24 mm$^2$.

Figure 13:
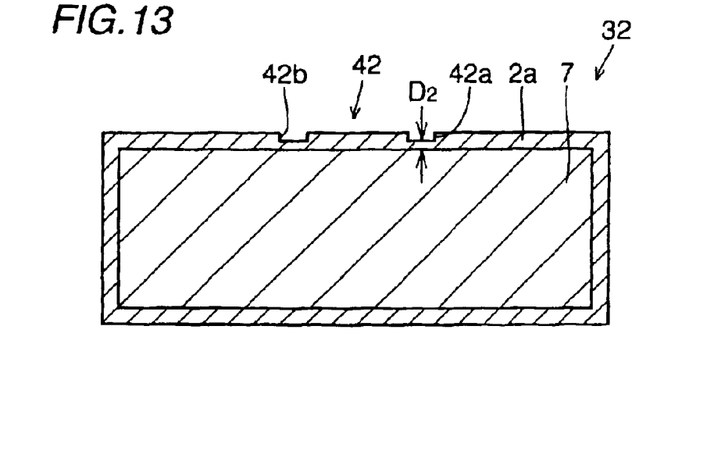
FIG. 13 is a view representing a section taken on line XIII—XIII of FIG. 12.

Referring to FIG. 13, the grooves 42a and 42b are provided on the side face 2a. A thickness $D_2$ of the thin portions of the grooves 42a and 42b ranges from 0.05 to 0.2 mm. The portions where the grooves 42a and 42b are formed are relatively thin portions of the iron plate constituting the side face 2a and the other portion than the portions of the grooves 42a and 42b is the relative thick portion of the iron plate. The relatively thin portions and the relatively thick portion are fabricated in one body with each other.

Figure 14:
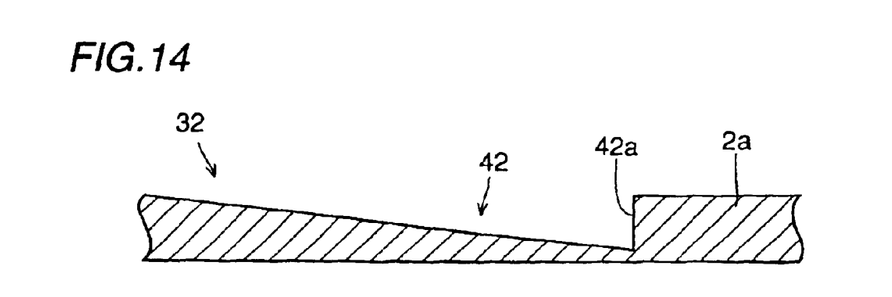
FIG. 14 is a view representing a section taken on line XIV—XIV of FIG. 12.

Referring to FIG. 14, a depth of the groove 42a is larger at a point closer to an intersection of the grooves 42a and 42b. That is, a thickness of the iron plate is thinner at a point closer to the intersection of the grooves 42a and 42b. The smallest thickness of the side face 2a plate in the groove 42a is 0.05 mm.

Even the battery 32 constructed in such a way has an effect similar to the battery 31 shown in FIG. 10. Furthermore, since the iron plate is the thinnest at the intersection between the grooves 42a and 42b, the safety valve 42 operates at a lower pressure, with the result that a higher level of safety can be ensured.

Tenth Embodiment

Figure 15:
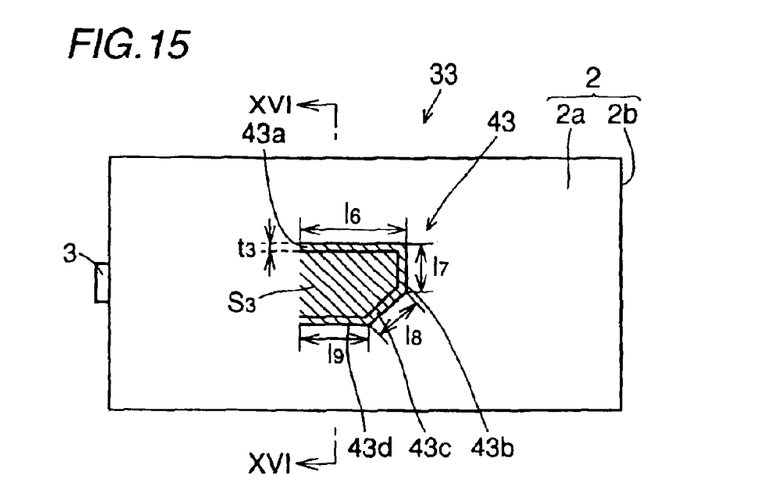
FIG. 15 is a top view of a battery according to a tenth embodiment of the present invention.

Referring to FIG. 15, a battery 33 according to the tenth embodiment of the present invention is different from the battery 31 shown in FIG. 10 having the safety valve 41 of the shape of a rectangle in that the battery 33 has a safety valve 43 of the shape of a pentagon. The safety valve 43 is constituted of grooves 43a to 43d, and a region surrounded by the grooves 43a to 43d. That is, the safety valve 43 is formed with a portion shadowed by hatching of FIG. 15. A length $l_6$ of the groove 43a is 10 mm. A length $l_7$ of the groove 43b is 3 mm. A length $l_8$ of the groove 43c is 4 mm. A length $l_9$ of the groove 43d is 7 mm. An area $S_3$ of the region shadowed by hatching is 58 mm². Furthermore, a width $t_3$ of the grooves 43a to 43d ranges 0.05 to 2 mm.

Figure 16:
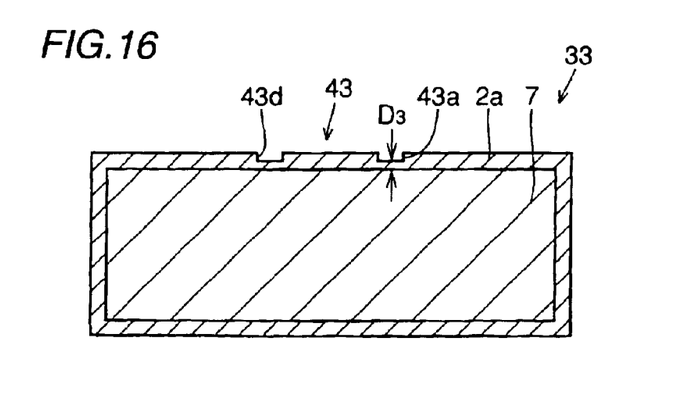
FIG. 16 is a view representing a section taken on line XVI—XVI of FIG. 15.

Referring to FIG. 16, the grooves 43a and 43d are provided on the side face 2a. A thickness $D_3$ of thin portions of the grooves 43a and 43d is a constant value ranging from 0.05 to 0.2 mm. Furthermore, a thickness of the thin portions of the grooves 43b and 43c is also $D_3$. The portions where the grooves 43a to 43d are formed are the relatively thin portions of the iron plate constituting the side face 2a and the other portion than the grooves 43a to 43d is the relatively thick portion of the iron plate. The relatively thin portions and the relative thick portion are fabricated in one body with each other.

The battery 33 constructed in such a way also has an effect similar to that of the battery 31 shown in FIGS. 10 and 11.

Eleventh Embodiment

Figure 17:
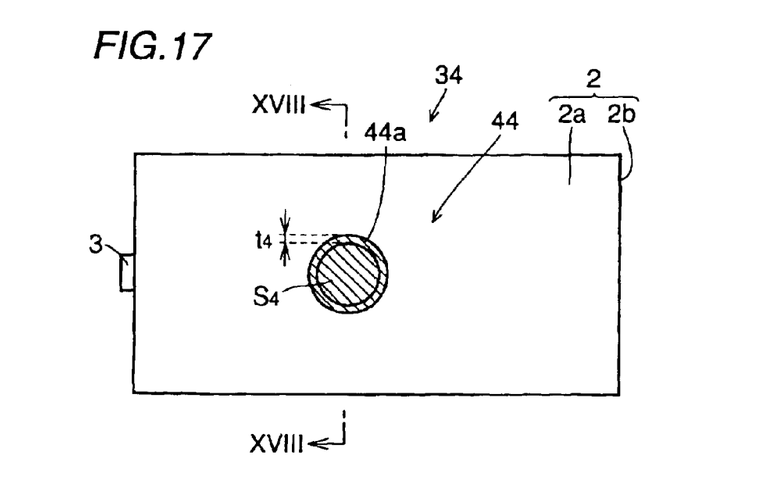
FIG. 17 is a top view of a battery according to an eleventh embodiment of the present invention.

Referring to FIG. 17, a battery 34 according to the eleventh embodiment of the present invention is different from the battery 31 shown in FIG. 10 whose safety valve 31 is of the shape of a tetragon in that in the battery 34, a safety valve 44 is the shape of a circle. The safety valve 44 is constituted of a groove 44a and a region surrounded thereby, that is the safety valve 44 is constituted of a portion shadowed by hatching of FIG. 17. A width $t_4$ of the groove 44 ranges from 0.05 to 5 mm and a length thereof is 30 mm. The groove 44a is fabricated in the shape of a closed circle. An area $S_4$ of a portion shadowed by hatching is 80 mm².

Figure 18:
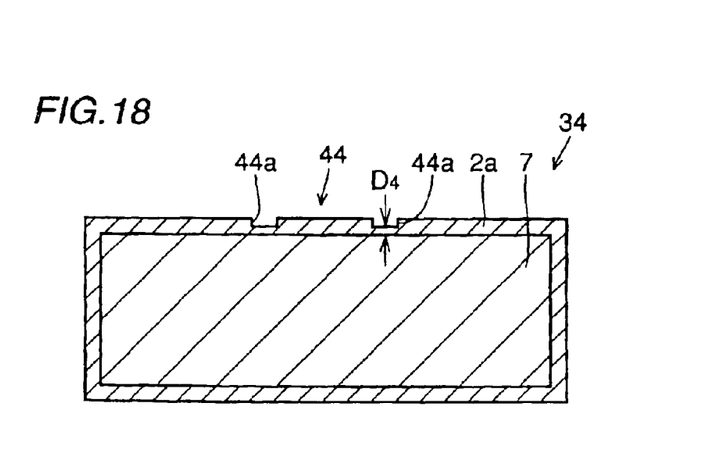
FIG. 18 is a view representing a section taken on line XVIII—XVIII of FIG. 17.

Referring to FIG. 18, the groove 44a is provided on the side face 2a. A thickness $D_4$ of a thin portion of the groove 44a ranges from 0.05 to 0.2 mm. A depth of the groove 44a is almost constant over the entire length. The groove 44a is the relatively thin portion of an iron plate constituting the side face 2a and a portion surrounded by the groove 44a is a relatively thick portion of the iron plate. The relatively thin portion and the relatively thick portion are fabricated in one body with each other.

The battery 34 constructed in such a way also has an effect similar to the battery 31 shown in FIGS. 10 and 11 according to the eighth embodiment.

Twelfth Embodiment

Figure 19:
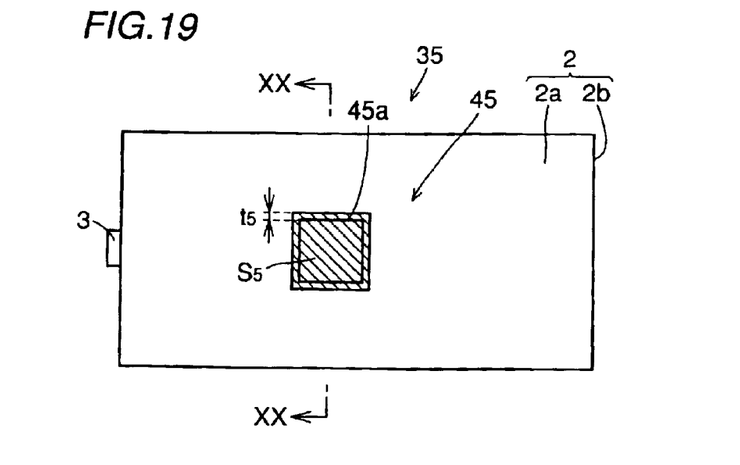
FIG. 19 is a top view of a battery according to a twelfth embodiment of the present invention.

Referring to the FIG. 19, a battery 35 according to the twelfth embodiment of the present invention is different from the battery 31 shown in FIG. 10 in which the grooves 41a to 41c is arranged so as to be of the shape having an opening to constitute a safety valve 41 in that in the battery 35, a groove 45a forms a closed figure to form a safety valve of the shape of a tetragon. A width $t_5$ of the groove 45a ranges from 0.05 to 2 mm and a total length of the groove 45a is 30 mm. The groove 45a and a portion surrounded by the groove 45a constitute the safety valve 45. That is, a portion shadowed by hatching in FIG. 19 constitutes the safety valve 45. An area $S_5$ of the portion shadowed by hatching is 56 mm². The grooves 45a forms a closed figure.

Figure 20:
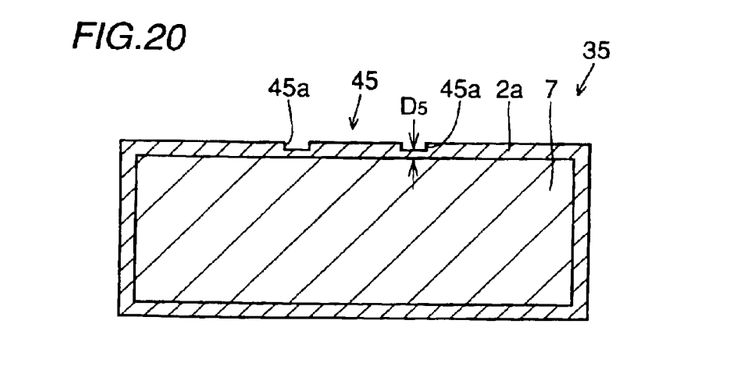
FIG. 20 is a view representing a section taken on line XX—XX of FIG. 19.

Referring to FIG. 20, a thickness $D_5$ of the thin portion of the groove 45a constituting the safety valve 45 is almost a constant value ranging from 0.05 to 0.2 mm along the entire length. A portion where the groove 45a is formed is the relatively thin portion of an iron plate, while a portion surrounded by the groove 45a is the relatively thick portion of the iron plate. The relatively thin portion and the relatively thick portion are fabricated in one body with each other.

The battery 35 constructed in such a way has an effect similar to that of the battery 31 shown in FIGS. 10 and 11.

Thirteenth Embodiment

Figure 21:
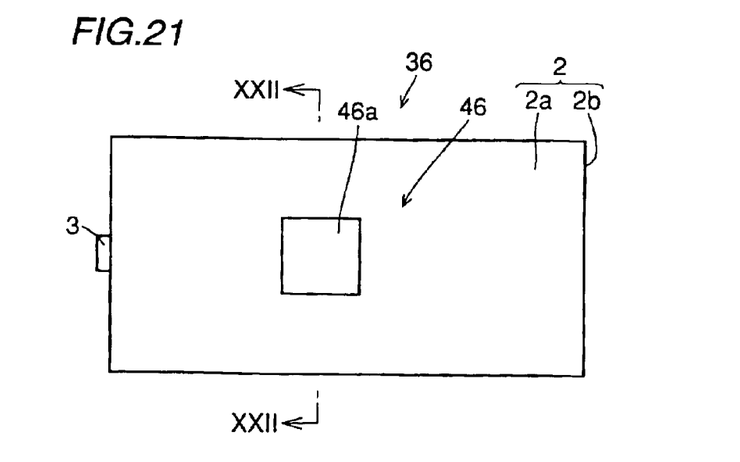
FIG. 21 is a top view of a battery according to a thirteenth embodiment of the present invention.

Referring to FIG. 21, a battery 36 according to the thirteenth embodiment of the present invention is different from the battery 31 shown in FIG. 10 whose safety valve 41 does not use a prescribed thin plate in that in the battery 36, the prescribed thin plate 46a constitutes a safety valve 46. The thin plate 46a is made of an iron plate. A size of the thin plate 46a is of 3 mm in length×10 mm in width×0.05 mm in thickness. The thin plate 46a is fixed to a side face 2a by welding.

Figure 22:
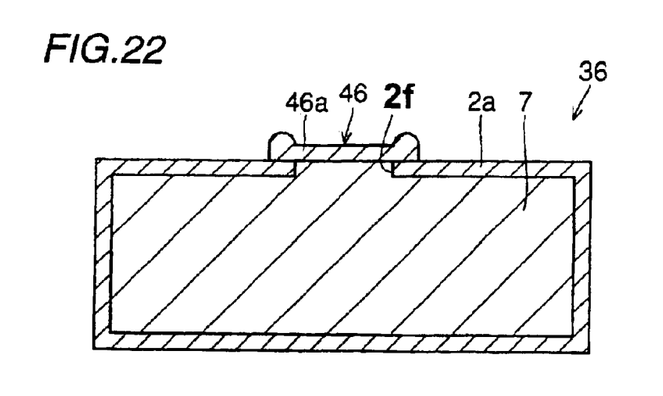
FIG. 22 is a view representing a section taken on line XXII—XXII of FIG. 21.

Referring to FIG. 22, the thin plate 46 covers a hole 2f formed at the side face 2a. Since the thin plate 46a is mounted to the side face 2a so as to stop the hole 2f, no chance arises of leakage of electrolyte constituting a power generating element 7 through the hole 2f. Since a thickness of the thin plate 46a is less than that of an iron plate constituting the side face 2a, the thin plate 46a can be broken to prevent an increase in internal pressure of the battery 36 when the electrolyte in the power generating element 7 evaporates to produce a high pressure within the battery 36.

While description has been given of the embodiments of the present invention, the embodiments shown here can be modified or altered in various ways. First, taking up a shape of an exterior can, while a rectangular prism shown in FIG. 1 and a cylinder shown in FIG. 3 have been adopted, but there is no specific limitation to those shapes. For example, an exterior may be so shaped as to be in conformity with a case of an equipment in which a battery is contained.

As methods for fabricating a safety valve, press or laser processing can be applied in any of the above stated embodiments. Furthermore, the fabrication methods are not limited to such processings but may be to grind off an iron plate to a smaller thickness. Alternatively, part of an iron plate may be etched off by chemical etching to attain a thin portion.

Moreover, while iron has been shown as material constituting an exterior can, a cathode terminal and an anode terminal, there is no limitation to the material, but other materials having electrical conductivity, for example aluminum or copper, may be employed instead.

Furthermore, while a portable telephone has been shown as a portable equipment, a battery of the present invention can be used in other portable equipments such as a note book PC, a word processor, a combination camera/VTR (Video Tape Recorder) system and a liquid crystal television.

Besides, as a type of a battery of the present invention, either of primary and secondary batteries can be adopted to name a few, a lithium battery or a nickel cadmium battery, or a lead storage battery.

Furthermore, as a shape of a safety valve, there have been shown a triangle, a tetragon, a pentagon and a circle, but there is no limitation thereto, but a simple straight line or a cross may also be adopted.

INDUSTRIAL APPLICABILITY

A battery of the present invention can be used in a portable telephone, a note book PC, a word processor, a liquid crystal television, a combination camera/VTR and others. Furthermore, a portable equipment of the present invention can be utilized in applications such as a portable telephone, and besides, a personal computer, a word processor and a liquid crystal television capable of communication using an electromagnetic wave.

What is claimed is:

1. A battery comprising:
an exterior member of a tube-like shape; and a safety valve provided to said exterior member to reduce an internal pressure of said battery, wherein said exterior member includes a relatively thick portion and a relatively thin portion and said relatively thin portion constitutes said safety valve;

wherein said exterior member is a one-piece, unitary structure having thin and thick portions;

wherein said relatively thin portion is formed so as to surround part of said relatively thick portion; and wherein an electrode terminal is disposed on the exterior surface of said part of said relatively thick portion surrounded by said relatively thin portion.

2. The battery according to claim 1, wherein said safety valve is formed at a side face of said battery.

3. The battery according to claim 1, wherein at least one of a length, a thickness and a shape of said relatively thin portion and a total area of said relatively thin portion and a region surrounded by said relatively thin portion is adjusted to set an internal pressure of said battery at which said safety valve operates.

4. A portable equipment comprising:

a battery; and a body of said portable equipment to which said battery is mounted, wherein said battery includes:

an exterior member of a tube-like shape and a safety valve provided to said exterior member to reduce an internal pressure of said battery, said exterior member includes a relatively thick portion and a relatively thin portion and said relatively thin portion constitutes said safety valve and said safety valve is located so as to face said body of said portable equipment;

wherein said exterior member is a one-piece, unitary structure having thin and thick portions;

wherein said relatively thin portion is formed so as to surround part of said relatively thick portion; and wherein an electrode terminal is disposed on the exterior surface of said part of said relatively thick portion surrounded by said relatively thin portion.

5. The portable equipment according to claim 4, further comprising:

a shield member interposing between said battery and said body of said portable equipment.

* * * * *